(12) United States Patent
Jang et al.

(10) Patent No.: US 12,182,361 B2
(45) Date of Patent: *Dec. 31, 2024

(54) DISPLAY DEVICE HAVING TOUCH SENSOR AND METHOD FOR DRIVING THE SAME

(71) Applicant: LG Display Co., Ltd., Seoul (KR)

(72) Inventors: Hyun Woo Jang, Goyang-si (KR); Ki Yong Kim, Gimpo-si (KR); Jae Kyu Park, Gimpo-si (KR); Young Woo Jo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,793

(22) Filed: Nov. 17, 2023

(65) Prior Publication Data
US 2024/0086012 A1 Mar. 14, 2024

Related U.S. Application Data

(63) Continuation of application No. 17/466,818, filed on Sep. 3, 2021, now Pat. No. 11,861,108.

(30) Foreign Application Priority Data

Dec. 29, 2020 (KR) .................. 10-2020-0186537

(51) Int. Cl.
G06F 3/041 (2006.01)
G06F 3/044 (2006.01)
(52) U.S. Cl.
CPC ...... G06F 3/0418 (2013.01); G06F 3/041662 (2019.05)

(58) Field of Classification Search
CPC ............. G06F 3/0418; G06F 3/041662; G06F 3/04166; G06F 3/0443; G06F 3/0412; G06F 3/0446; G06F 3/04162; G06F 3/0442

See application file for complete search history.

(56) References Cited

U.S. PATENT DOCUMENTS

| 9,958,993 B2 | 5/2018 | Akhavan Fomani et al. |
| 10,908,719 B2* | 2/2021 | Jun .................. G06F 3/0443 |
| 2012/0182256 A1* | 7/2012 | Kitada ............... G06F 3/04166 345/174 |
| 2012/0206154 A1* | 8/2012 | Pant .................... G06F 3/0446 324/613 |
| 2013/0257786 A1* | 10/2013 | Brown ................ G06F 3/0443 345/174 |

(Continued)

FOREIGN PATENT DOCUMENTS

| KR | 10-2014-0066818 A | 6/2014 |
| KR | 10-2017-0072730 A | 6/2017 |

*Primary Examiner* — Md Saiful A Siddiqui
(74) *Attorney, Agent, or Firm* — Birch, Stewart, Kolasch & Birch, LLP

(57) ABSTRACT

A display device having a touch sensor can include a display panel including a plurality of touch electrodes, and a readout integrated circuit (IC). Also, the readout IC is configured to apply a touch driving signal to the plurality of touch electrodes and amplify charges from the plurality touch electrodes according to an amplifier reset signal to generate an amplifier output voltage, and differentially adjust a toggle timing of the amplifier reset signal based on positions of the plurality of touch electrodes to control a level of the amplifier output voltage.

15 Claims, 13 Drawing Sheets

(56) References Cited

U.S. PATENT DOCUMENTS

| | | |
|---|---|---|
| 2013/0278334 A1* | 10/2013 | Murugesan .......... H03F 3/3022 |
| | | 330/192 |
| 2015/0346879 A1 | 12/2015 | Jeong et al. |
| 2018/0004353 A1 | 1/2018 | Shin |
| 2018/0173342 A1 | 6/2018 | Lee et al. |
| 2019/0187832 A1 | 6/2019 | Lee et al. |
| 2019/0204971 A1 | 7/2019 | Kang et al. |
| 2020/0319740 A1 | 10/2020 | Ko |

\* cited by examiner

DISPLAY DEVICE HAVING TOUCH SENSOR AND METHOD FOR DRIVING THE SAME

CROSS-REFERENCE TO RELATED APPLICATIONS

This application is a Continuation Application of U.S. application Ser. No. 17/466,818, filed on Sep. 3, 2021 (now U.S. Pat. No. 11,861,108 issued on Jan. 2, 2024), which claims the priority benefit of Korean Patent Application No. 10-2020-0186537, filed in the Republic of Korea on Dec. 29, 2020, where the entire contents of all these applications are hereby expressly incorporated by reference as if fully set forth herein into the present application.

BACKGROUND OF THE INVENTION

Field of the Invention

The present disclosure relates to a display device having a touch sensor and a method for driving the same.

Discussion of the Related Art

A display device having a touch sensor capable of sensing touch input is known. In a display device having a touch sensor, parasitic capacitance and load resistance generated in a touch electrode and a touch line vary according to a distance between a touch sensing circuit and the touch electrode. As a result, an RC value increases as the distance between the touch sensing circuit and the touch electrode increases, which can lead to a decrease in touch sensitivity.

When a touch gain is determined based on a first position having the highest touch sensitivity, touch sensitivity at a second position relatively far away from the touch sensing circuit may deteriorate. On the other hand, when the touch gain is determined based on the second position having low touch sensitivity, a touch sensing value at the first position relatively close to the touch sensing circuit is saturated and thus touch sensitivity may deteriorate.

It is desirable that a touch sensitivity deviation be small throughout a touch panel. Since the touch sensitivity deviation is proportional to the size of the touch panel, sensitivity deviation at each touch electrode position needs to be improved in the case of a large touch panel.

SUMMARY OF THE INVENTION

Accordingly, the present disclosure provides a display device having a touch sensor and a method for driving the same to improve touch performance by improving sensitivity deviations at positions of touch electrodes.

To achieve these objects and other advantages and in accordance with the purpose of the invention, as embodied and broadly described herein, a display device having a touch sensor includes a display panel including a plurality of touch electrodes, a touch sensing circuit configured to apply a touch driving signal to the touch electrodes and to amplify charges flowing from the touch electrodes based on an amplifier reset signal to generate an amplifier output voltage, and an amplifier output control circuit configured to adjust at least one of a toggle timing of the amplifier reset signal and a voltage amplitude of the touch driving signal to differentially control a level of the amplifier output voltage depending on positions of the touch electrodes.

In another aspect of the present invention, a method for driving a display device having a touch sensor includes applying a touch driving signal to touch electrodes of a display panel and amplifying charges flowing from the touch electrodes based on an amplifier reset signal to generate an amplifier output voltage, and adjusting at least one of a toggle timing of the amplifier reset signal and a voltage amplitude of the touch driving signal to differentially control a level of the amplifier output voltage depending on positions of the touch electrodes.

The display device having a touch sensor according to the embodiment of the present disclosure can improve sensitivity deviations at positions of touch electrodes to enhance touch performance.

Furthermore, the display device having a touch sensor according to the embodiment of the present disclosure can improve sensitivity deviations between sensing modes to enhance touch performance.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts. In the following description, a detailed description of known functions and configurations incorporated herein will be omitted when it can obscure the subject matter of the present disclosure.

Figure 1:
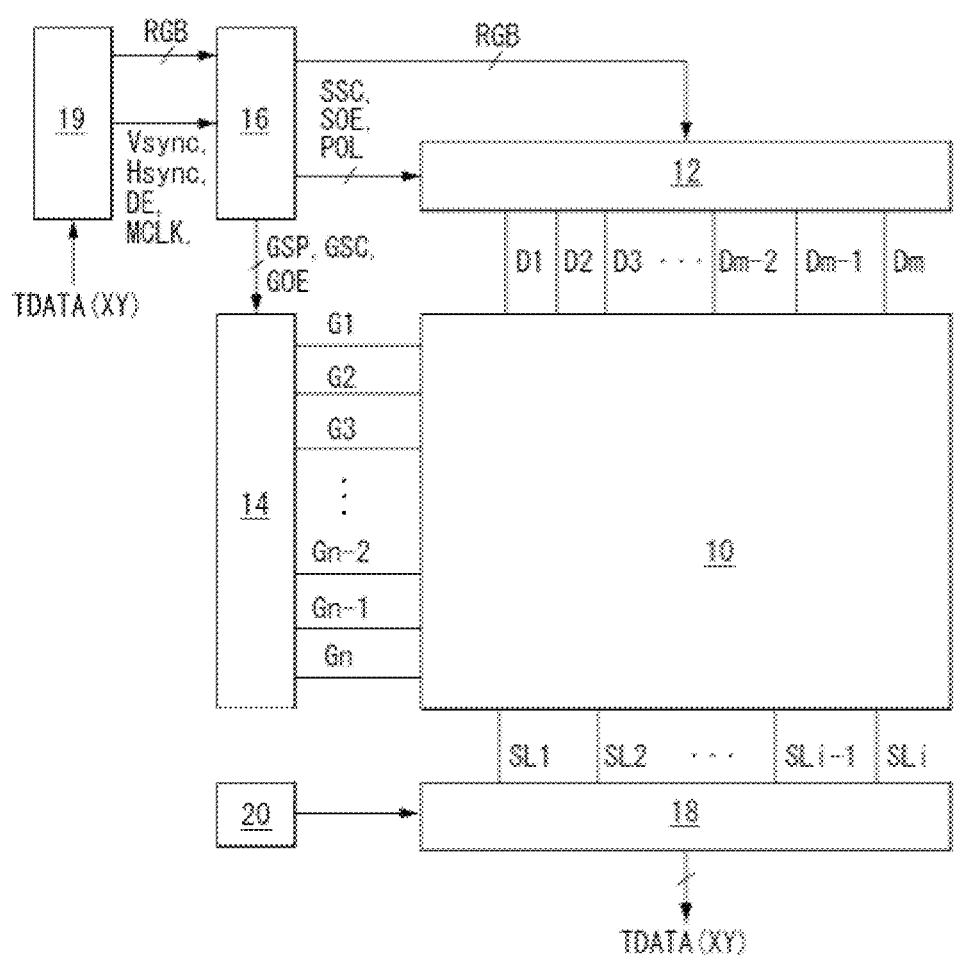
FIG. 1 and FIG. 2 are diagrams illustrating a display device having a touch sensor according to an embodiment of the present disclosure.
Figure 2:
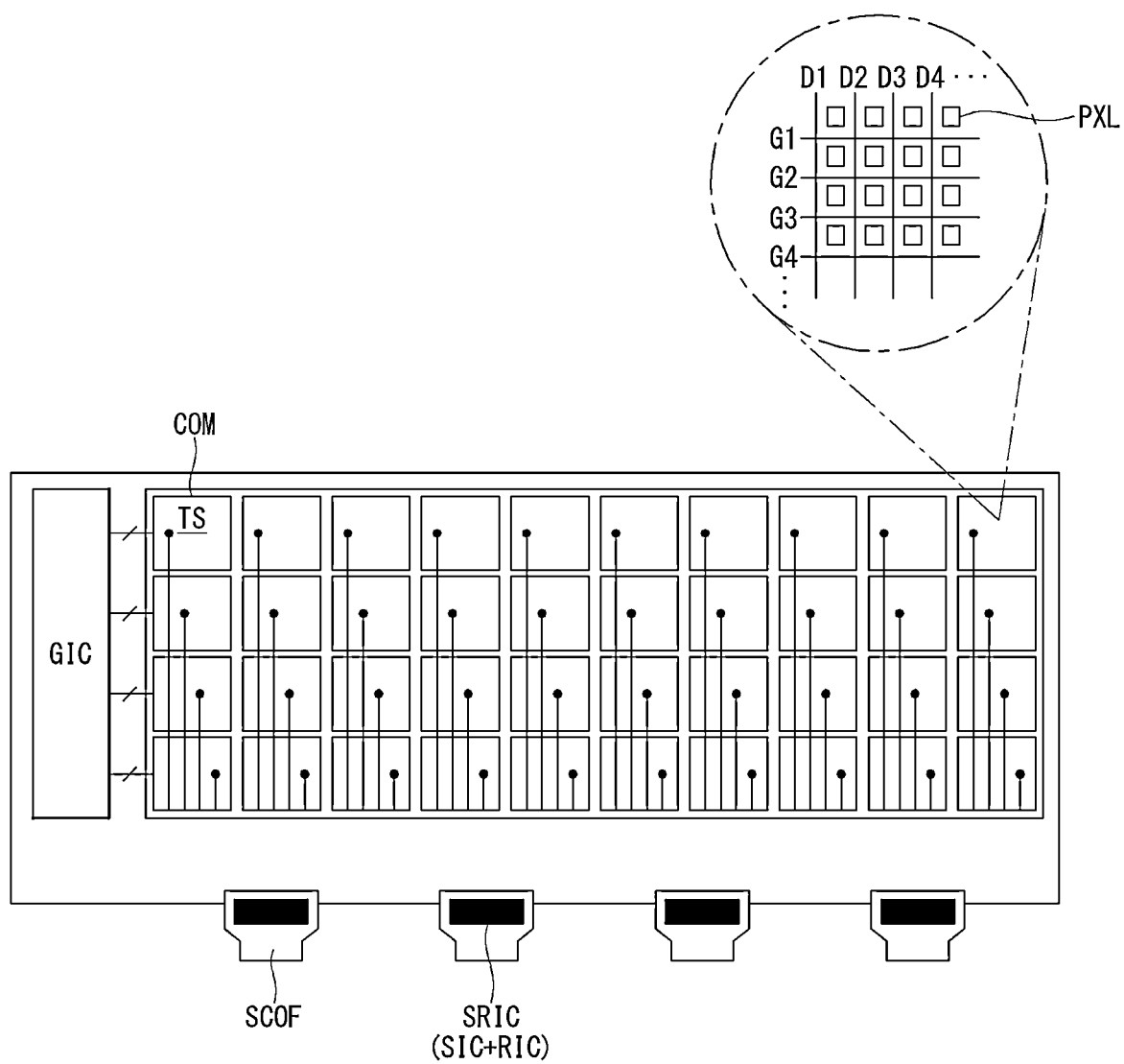

FIG. 1 and FIG. 2 are diagrams illustrating a display device having a touch sensor according to an embodiment of the present disclosure. All the components of each display device according to all embodiments of the present disclosure are operatively coupled and configured.

Referring to FIG. 1 and FIG. 2, a display device having a touch sensor according to the present disclosure can be implemented based on a flat panel display such as a liquid crystal display (LCD), a field emission display (FED), a plasma display panel (PDP), an organic light emitting display (OLED), or an electrophoretic display (EPD). Although the display device is implemented as an LCD in the following embodiment(s), the display device of the present disclosure is not limited to the LCD and other variations are possible.

The display device having a touch sensor of the present disclosure can include a display panel 10, a data driving circuit 12, a gate driving circuit 14, a timing controller 16, a touch driving circuit 18, a host system 19, and a power supply circuit 20.

The display panel 10 includes a liquid crystal layer formed between two substrates. A pixel array of the display panel 10 includes pixels PXL formed in pixel regions defined by data lines D1 to Dm (m being a positive integer) and gate lines G1 to Gn (n being a positive integer). Each pixel PXL can include thin film transistors (TFTs), a pixel electrode charging a data voltage, a storage capacitor Cst for maintaining a voltage of a liquid crystal cell, and a common electrode COM formed at each of intersections of the data lines D1 to Dm and the gate lines G1 to Gn.

The common electrode COM of the pixels PXL is divided into segments, and touch electrodes TS are implemented as the common electrode segments. A single common electrode segment is commonly connected to a plurality of pixels PXL and forms a single touch electrode TS. A plurality of touch electrodes arranged on a line can form a touch block line. Each touch sensor can include pixels defined by gate lines and data lines. Each touch block line overlaps a plurality of pixel lines, and one touch block line is wider than one pixel line. Here, one pixel line is composed of pixels PXL arranged in a line.

A black matrix and a color filter can be formed on an upper substrate of the display panel 10. A lower substrate of the display panel 10 can be implemented in a color filter on TFT (COT) structure. In this case, the black matrix and the color filter can be formed on the lower substrate of the display panel 10. The common electrode provided with a common voltage can be formed on the upper substrate or the lower substrate of the display panel 10. A polarizer can be attached to the upper substrate and the lower substrate of the display panel 10 and an alignment film for setting a pre-tilt angle of liquid crystal is formed on inner sides of the upper and lower substrates which come into contact with the liquid crystal. Column spacers for maintaining a cell gap of liquid crystal cells are formed between the upper and low substrates of the display panel 10.

A backlight unit can be provided on the backside of the display panel 10. The backlight unit is implemented as an edge type or direct type backlight unit and radiates light to the display panel 10. The display panel 10 can be implemented in any of known liquid crystal modes such as a twisted nematic (TN) mode, a vertical alignment (VA) mode, an in-plane switching (IPS) mode, and a fringe field switching (FFS) mode.

The timing controller 16 receives timing signals, such as a vertical synchronization signal Vsync, a horizontal synchronization signal Hsync, a data enable signal DE, and a main clock signal MCLK, input from the host system 19 and controls operation timing of the data driving circuit 12, the gate driving circuit 14, and the touch driving circuit 18. A scan timing control signal can include a gate start pulse signal GSP, a gate shift clock signal GSC, and a gate output enable signal GOE. A data timing control signal can include a source sampling clock signal SSC, a polarity control signal POL, and a source output enable signal SOE. The timing controller 16 can include a micro-controller unit (MCU) shown in FIG. 12 to FIG. 15.

Figure 16:
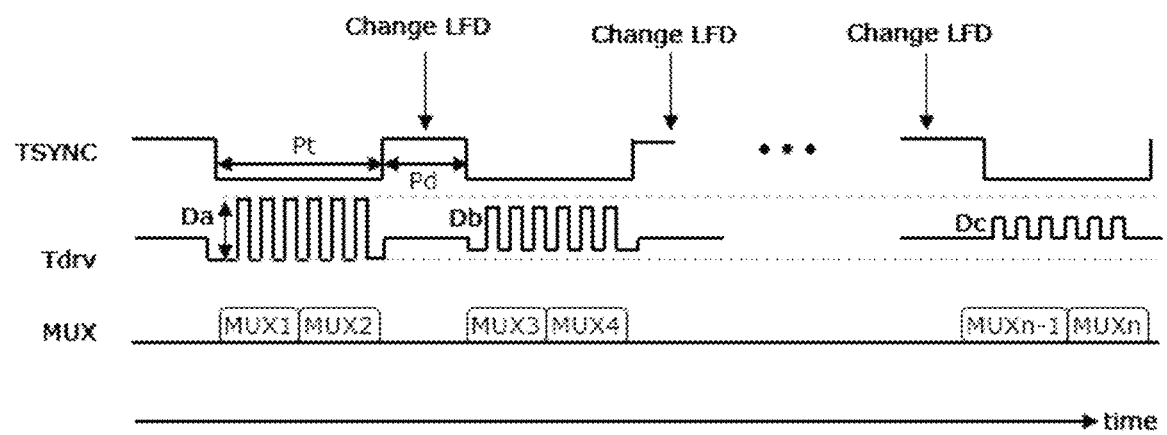
FIG. 16 and FIG. 17 are diagrams illustrating an example of a hybrid configuration for differentially adjusting the toggle timing of the amplifier reset signal and the voltage amplitude of the touch driving signal depending on positions of touch electrodes.
Figure 18:
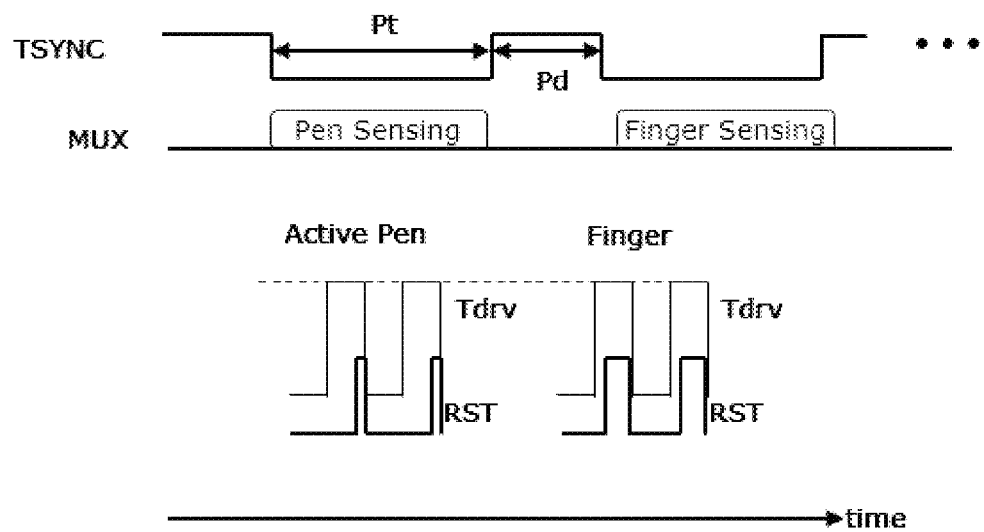
FIG. 18 is a diagram illustrating an example of differentially adjusting the toggle timing of the amplifier reset signal in a finger sensing mode and a pen sensing mode.
Figure 19:
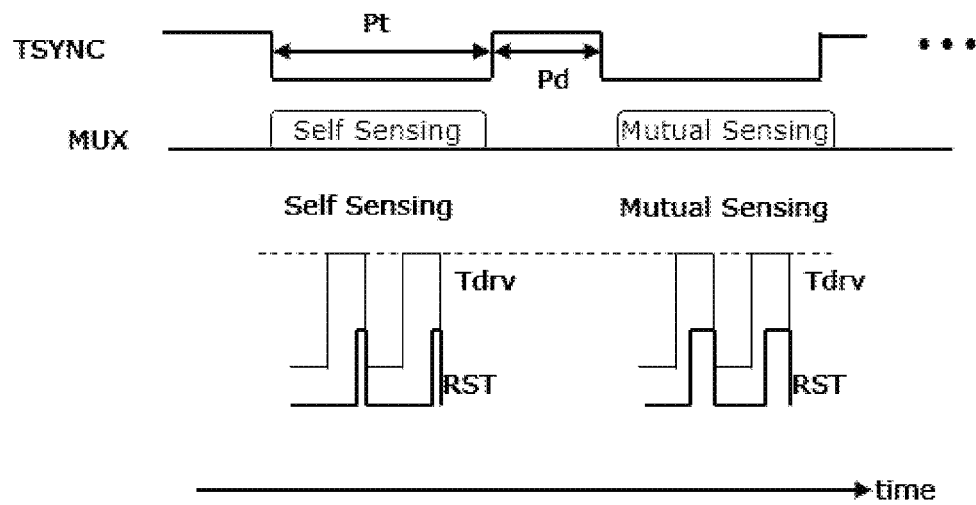
FIG. 19 is a diagram illustrating an example of differentially adjusting the toggle timing of the amplifier reset signal in a self-sensing mode and a mutual sensing mode.

The timing controller 16 can temporally divide a driving period of the display panel into a display driving period Pd and a touch sensor driving period Pt based on a touch synchronization signal (refer to TSYNC in FIGS. 16, 18 and 19). The data driving circuit 12, the gate driving circuit 14, and the touch driving circuit 18 are synchronized in response to the touch synchronization signal TSYNC. A first logic level of the touch synchronization signal TSYNC defines the display driving period Pd and a second logic level thereof defines the touch sensor driving period Pt. The first logic level can be a high logic level and the second logic level can be a low logic level, and vice versa.

The data driving circuit 12 and the gate driving circuit 14 write input image data RGB to the pixels PXL of the display panel 10 under the control of the timing controller 16.

The data driving circuit 12 includes a plurality of source driver integrated circuits (ICs) SIC, converts digital image data RGB input from the timing controller 16 into an analog positive/negative gamma compensation voltage according to the scan timing control signal to generate a data voltage, and outputs the data voltage in the display driving period Pd. The data voltage output from the data driving circuit 12 is supplied to the data lines D1 to Dm.

The data driving circuit 12 applies an AC signal (refer to Sdrv in FIG. 3) having the same phase and the same amplitude as those of a touch driving signal Tdrv applied to the touch electrodes TS in the touch sensor driving period Pt to the data line D1 to Dm to minimize parasitic capacitances between the touch electrodes TS and the data lines D1 to Dm and to reduce the influence of the parasitic capacitances on the touch electrodes TS. This is because charges stored in parasitic capacitors are reduced when voltages across the parasitic capacitors simultaneously change and voltage differences are smaller. When the influence of the parasitic capacitances on the touch electrodes TS is reduced, display noise mixed in a touch sensing result can be minimized and distortion of an amplifier output voltage that is a touch sensing signal can be prevented.

The gate driving circuit 14 generates a gate pulse signal synchronized with a data voltage with reference to the scan timing control signal and outputs the gate pulse signal to the gate lines G1 to Gn in the display driving period Pd to select one display line of the display panel 10 to which the data voltage is written.

The gate driving circuit 14 generates an AC signal having the same phase and the same amplitude as those of the touch driving signal Tdrv applied to the touch electrodes TS in the touch sensor driving period Pt and applies the AC signal to the gate line G1 to Gn to minimize parasitic capacitances between the touch electrodes TS and the gate lines G1 to Gn and to reduce the influence of the parasitic capacitances on the touch electrodes TS. When the parasitic capacitances between the touch electrodes TS and the gate lines G1 to Gn are minimized, display noise mixed in a touch sensing result can be minimized and distortion of an amplifier output voltage that is a touch sensing signal can be prevented.

The gate driving circuit 14 can be configured as a gate driver IC or can be directly formed on a lower glass substrate of the display panel 10 in a gate driver in panel (GIP) structure.

The touch driving circuit 18 includes readout ICs RIC. The touch driving circuit 18 drives and senses the touch electrodes TS included in the pixel array of the display panel 10 in the touch sensor driving period Pt. The touch electrodes TS can constitute a capacitance sensor for sensing touch input. The capacitance sensor can be implemented based on self-capacitance or mutual capacitance. The self-capacitance and mutual capacitance can be formed along a single-layer conductive line formed in one direction or can be formed between two orthogonal conductive lines.

Each readout IC RIC can include a touch sensing circuit (SU in FIG. 3) and an amplifier output control circuit operating in the touch sensor driving period Pt. The touch sensing circuit (SU in FIG. 3) applies the touch driving signal (Tdrv in FIG. 3) to the touch electrodes TS and amplifies charges flowing from the touch electrodes TS based on an amplifier reset signal (refer to RST in FIG. 4) to generate an amplifier output voltage. The amplifier output control circuit can differentially control the level of the amplifier output voltage depending on the positions of the touch electrodes TS by adjusting at least one of a toggle timing of the amplifier reset signal RST and a voltage amplitude of the touch driving signal Tdrv to improve sensitivity deviations at the positions of the touch electrodes and enhance touch performance.

The readout IC RIC and the source driver IC SIC can be integrated into one chip to be implemented as a source & readout IC SRIC, as illustrated in FIG. 2. The source & readout IC SRIC can be mounted on a source chip on film (SCOF).

The host system 19 can transmit the timing signals Vsync, Hsync, DE, and MCLK along with the digital image data RGB to the timing controller 16 and execute an application program associated with touch sensing data TDATA(XY) input from the touch driving circuit 18.

The host system 19 means a system main body of an electronic apparatus to which the display device of the present disclosure is applicable. The host system 19 can be any of a phone system, a television (TV) system, a set-top box, a navigation system, a DVD player, a Blu-ray player, a personal computer (PC), and a home theater system. The host system 19 receives touch input data TDATA(XY) from a touch sensing IC TIC and executes an application associated with touch input.

The power supply circuit 20 generates driving power necessary for operation of the touch driving circuit 18. The power supply circuit 20 can be implemented in the form of an integrated circuit such as a touch power IC (TPIC) in FIG. 12 and FIG. 14. The power supply circuit 20 may include the amplifier output control circuit (including a Tdrv adjuster in FIG. 14) as necessary.

Figure 3:
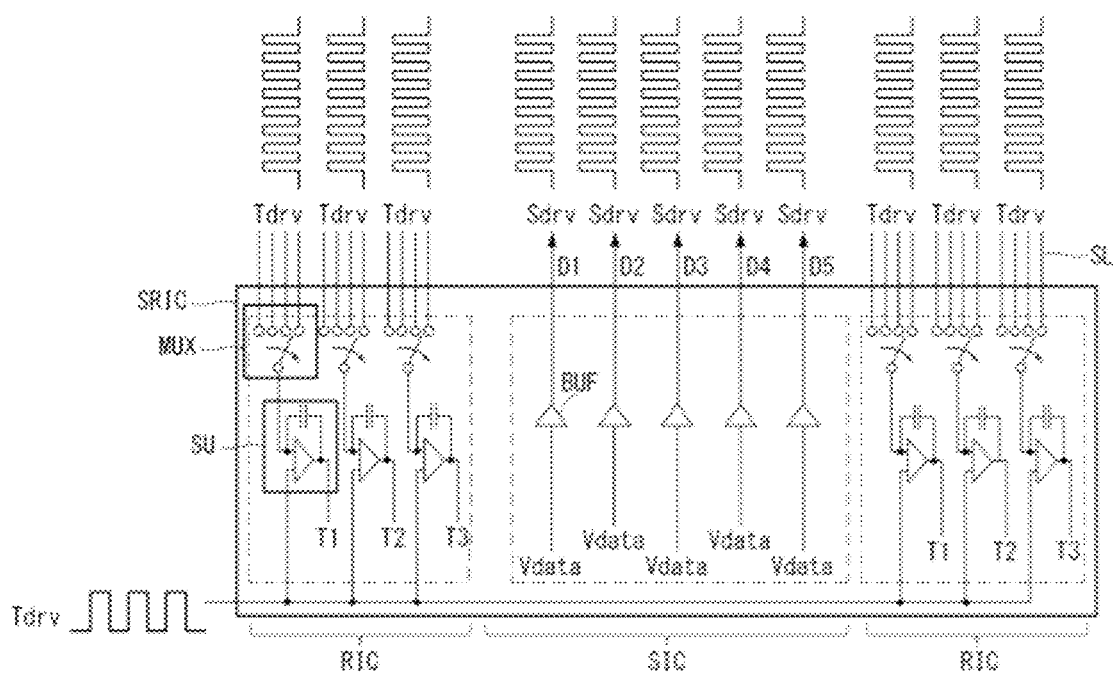
FIG. 3 is a diagram illustrating a configuration of a source & readout IC in which a data driving circuit and a touch driving circuit are integrated according to an example of the present disclosure.
Figure 4:
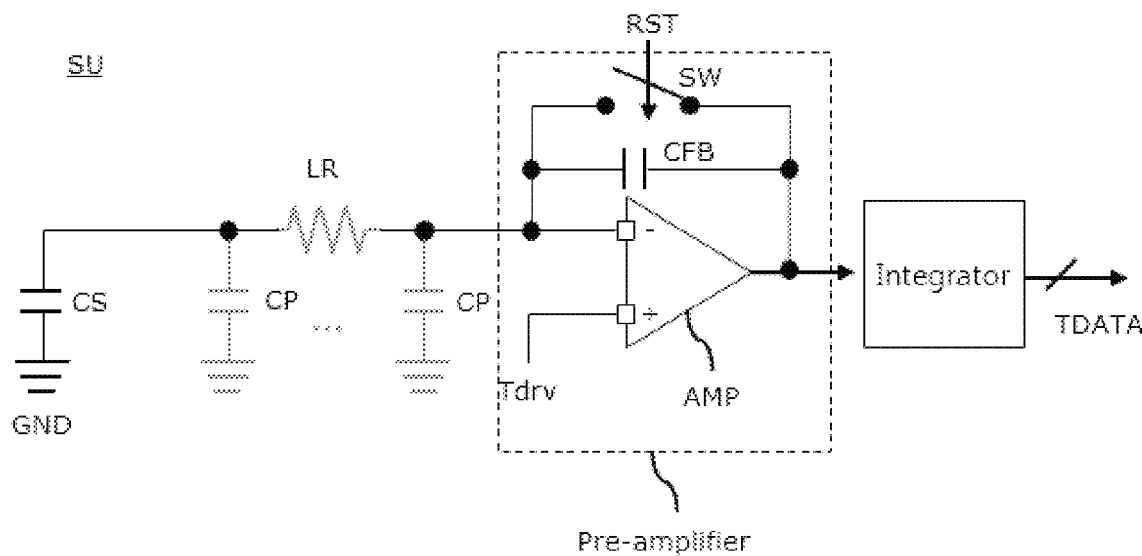
FIG. 4 is a diagram illustrating an example of the touch sensing circuit included in the source & readout IC.

FIG. 3 is a diagram illustrating a configuration of the source & readout IC in which the data driving circuit and the touch driving circuit are integrated according to the present disclosure and FIG. 4 is a diagram illustrating the touch sensing circuit included in the source & readout IC.

Referring to FIG. 3 and FIG. 4, the source & readout IC SRIC includes the source driver IC SIC that drives data lines D1 to D5 of the display panel 10 and the readout IC MC that drives touch lines SL connected to the touch electrodes TS of the display panel 10. The source driver IC SIC and the readout IC MC can be "circuits" which are functionally separate from each other in the source & readout IC SRIC.

The source driver IC SIC includes a digital-to-analog converter that generates a data voltage Vdata and an output buffer BUF that stabilizes the data voltage Vdata. The source driver IC SIC outputs the data voltage Vdata to the data lines D1 to D5 in the display driving period and outputs the AC signal (refer to Sdrv) for reducing the influence of parasitic capacitance on the data lines D1 to D5 in the touch sensor driving period.

The readout IC MC can include multiplexers MUX, touch sensing circuits SU, and a common voltage generator. The common voltage generator can be included in the power supply circuit 20 shown in FIG. 1. The common voltage generator generates a common voltage necessary to operate the display. The common voltage can be various display voltages according to display device types. For example, the common voltage can be a voltage applied to a common electrode in a liquid crystal display and can be a voltage applied to a cathode in an organic light emitting display device.

Each multiplexer MUX selectively connects the touch sensing circuit SU and the common voltage generator to touch electrodes under the control of the timing controller 16. When the touch screen has a resolution of M×N (M and N being positive integers equal to or greater than 2), the touch electrodes TS can be segmented into M×N touch electrode segments and M multiplexers can be provided. Each multiplexer MUX is connected to N touch electrodes TS through N touch lines SL and sequentially connects the N touch lines SL to a single touch sensing circuit SU.

The touch sensing circuit SU is connected to touch lines SL through the multiplexer MUX to apply the touch driving signal Tdrv to touch electrodes TS, senses charges flowing from the touch electrodes TS, and generates touch sensing data TDATA.

As illustrated in FIG. 4, the touch sensing circuit SU includes a pre-amplifier that amplifies a voltage of a touch capacitor CS based on the amplifier reset signal RST, an integrator that accumulates an amplifier output voltage of the pre-amplifier, and an analog-to-digital converter (ADC) that converts the output voltage of the integrator into digital data. The digital data generated by the ADC is transmitted to the host system as touch sensing data TDATA. When the touch screen has a resolution of M×N, M touch sensing circuits SU are required.

The touch capacitor CS has self-capacitance and mutual capacitance and is formed in the touch electrode. The pre-amplifier is connected to touch electrodes through the touch line SL and receives charges stored in the touch capacitor CS. A load resistance component LR and a parasitic capacitor component CP can be present on the touch line SL.

The pre-amplifier includes an amplifier AMP, a feedback capacitor CFB, and a reset switch SW. The inverted terminal (−) of the amplifier AMP is connected to the touch line SL and the non-inverted terminal (+) of the amplifier AMP is provided with the touch driving signal Tdrv. The output terminal of the amplifier AMP is connected to the integrator. The feedback capacitor CFB is connected between the inverted terminal (−) and the output terminal of the amplifier AMP. The reset switch is also connected between the inverted terminal (−) and the output terminal of the amplifier AMP. The reset switch SW switches on in synchronization with the toggle timing of the amplifier reset signal RST. The pre-amplifier stores charges flowing from the touch electrode in the feedback capacitor CFB until the reset switch SW switches on and supplies the stored voltage to the integrator as an amplifier output voltage. This amplifier output voltage can vary according to positions of touch electrodes depending on an RC value of the touch line SL, which can cause sensitivity deviations at positions of touch electrodes. Accordingly, a method for improving sensitivity deviations at positions as illustrated in FIG. 5 to FIG. 19 according to one or more embodiments of the present embodiments is provided and discussed in more detail below.

Figure 5:
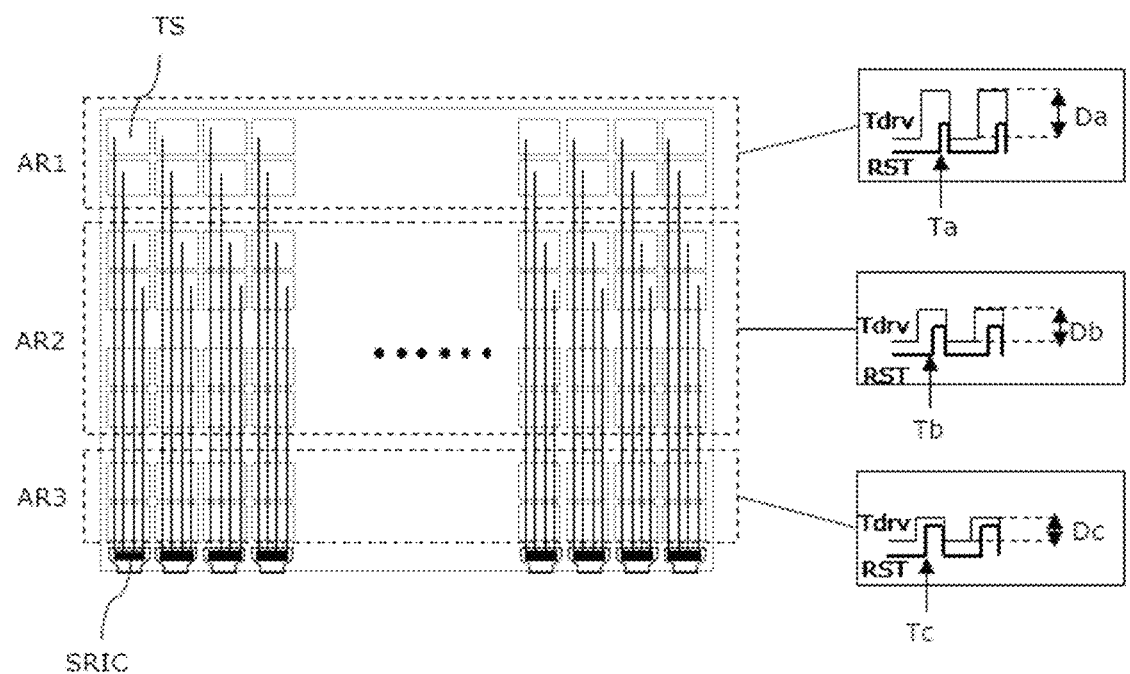
FIG. 5 is a diagram illustrating the concept of a technique for improving sensitivity deviations at positions of touch electrodes.
Figure 6:
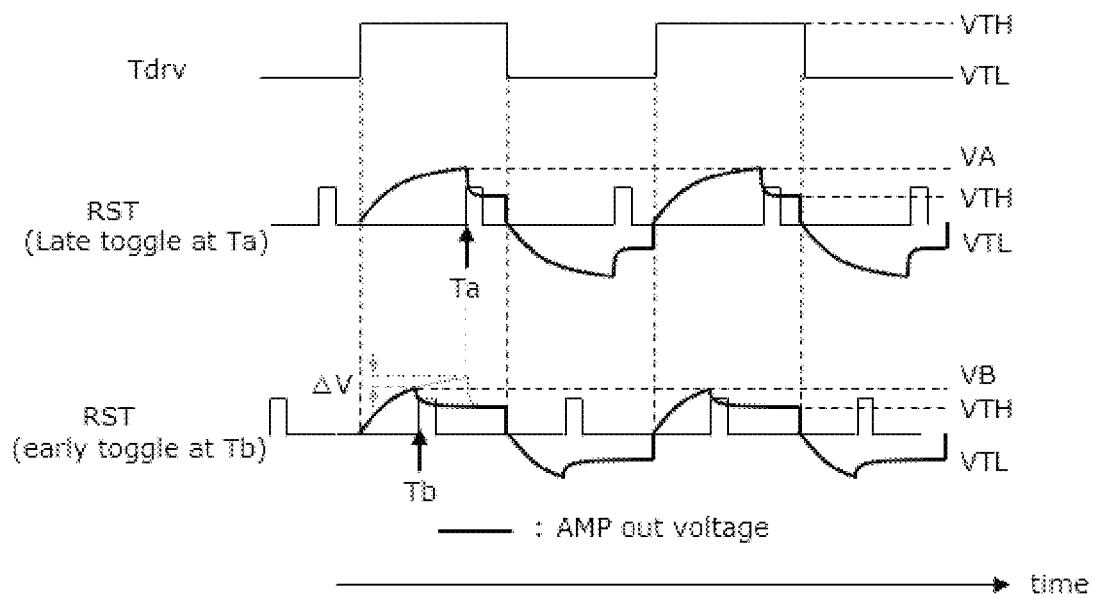
FIG. 6 and FIG. 7 are diagrams illustrating an example of differentially adjusting a toggle timing of an amplifier reset signal to be applied to the touch sensing circuit depending on positions of touch electrodes.
Figure 7:
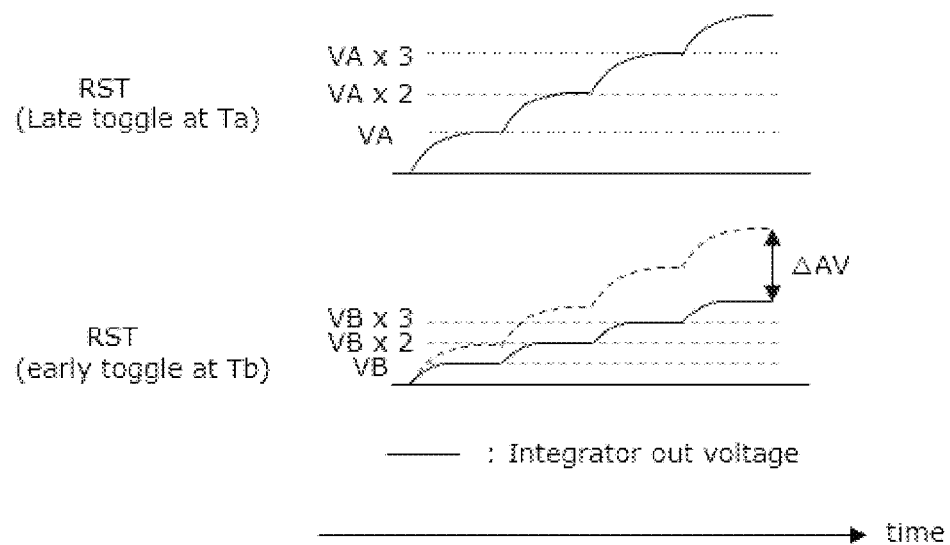
Figure 8:
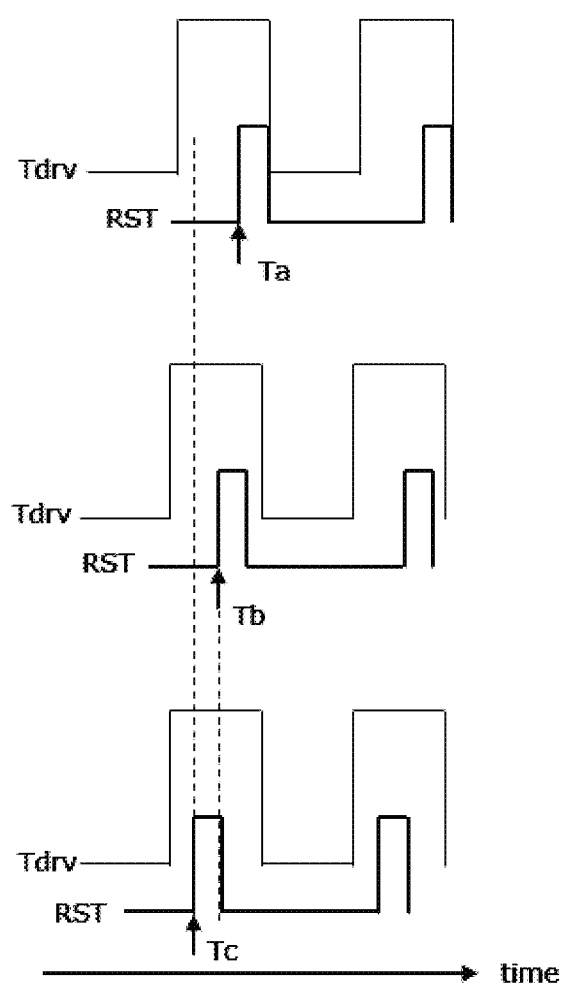
FIG. 8 and FIG. 9 are diagrams illustrating specific methods for adjusting the toggle timing of the amplifier reset signal.
Figure 9:
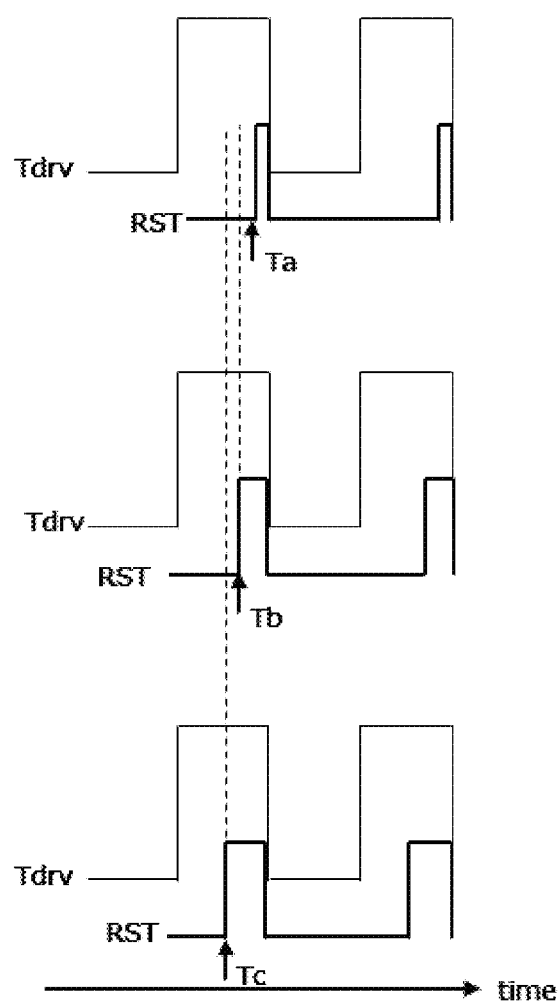
Figure 10:
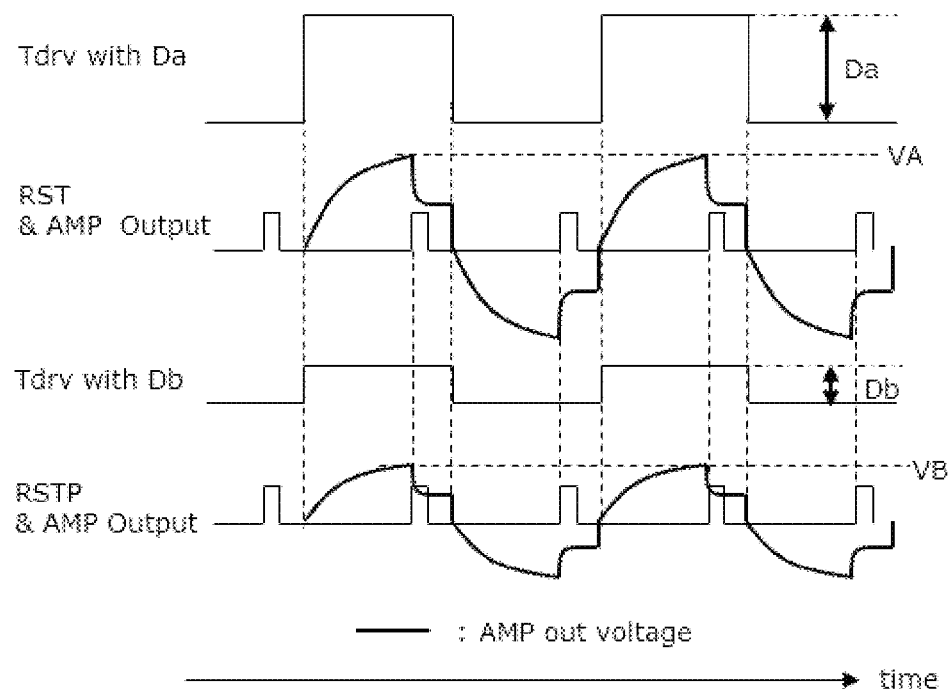
FIG. 10 and FIG. 11 are diagrams illustrating an example of differentially adjusting a voltage amplitude of a touch driving signal to be applied to the touch sensing circuit.
Figure 11:
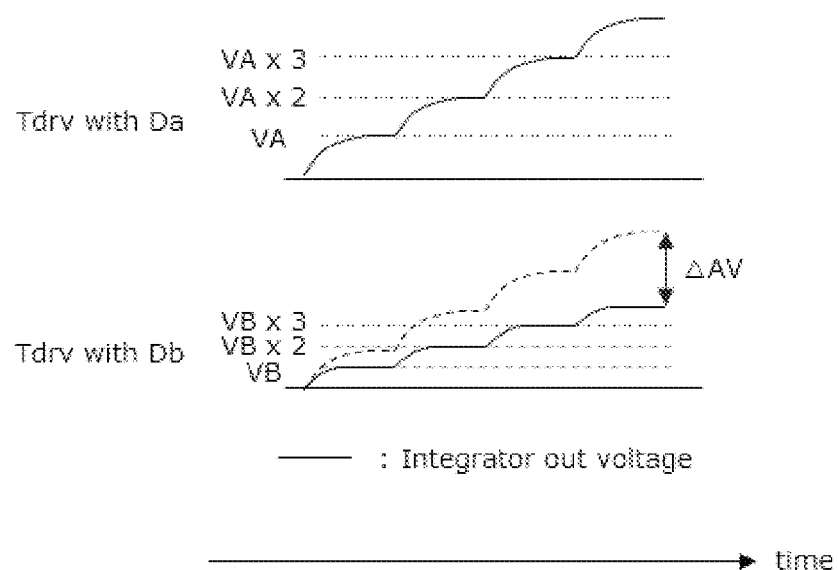

FIG. 5 is a diagram illustrating the concept of the technique for improving sensitivity deviations at positions of touch electrodes. FIG. 6 and FIG. 7 are diagrams illustrating an example of differentially adjusting the toggle timing of the amplifier reset signal to be applied to the touch sensing circuit depending on positions of touch electrodes. FIG. 8 and FIG. 9 are diagrams illustrating specific methods for adjusting the toggle timing of the amplifier reset signal. FIG. 10 and FIG. 11 are diagrams illustrating an example of differentially adjusting a voltage amplitude of the touch driving signal to be applied to the touch sensing circuit.

Referring to FIG. 5, the amplifier output control circuit differentially controls the level of the amplifier output voltage depending on positions of touch electrodes to improve sensitivity deviations at the positions of the touch electrodes. To this end, the amplifier output control circuit can adjust at least one of the toggle timing of the amplifier reset signal RST and the voltage amplitude of the touch driving signal Tdrv. In other words, the amplifier output control circuit can include at least one of an RST adjuster that differentially adjusts the toggle timing of the amplifier reset signal RST depending on positions of touch electrodes and a Tdrv adjuster that differentially adjusts the voltage amplitude of the touch driving signal Tdrv depending on positions of touch electrodes.

The RST adjuster can differentially adjust the toggle timing of the amplifier reset signal based on a predetermined on start timing and on duty of the amplifier reset signal depending on the positions of the touch electrodes.

The RST adjuster can adjust the toggle timing of the amplifier reset signal RST to a first on start timing Ta for touch electrodes at a first position AR1, adjust the toggle timing of the amplifier reset signal RST to a second on start timing Tb ahead of the first on start timing to for touch electrodes at a second position AR2, and adjust the toggle timing of the amplifier reset signal RST to a third on start timing Tc ahead of the second on start timing Tb for touch electrodes at a third position AR3. Here, the first position AR1 is farther from the touch sensing circuit SU than the second position AR2, and the second position AR2 is farther from the touch sensing circuit SU than the third position AR3.

Referring to FIG. 6 and FIG. 7, the pre-amplifier stores charges flowing from the touch electrodes at the first position AR1 in the feedback capacitor CFB from a rising timing of the touch driving signal Tdrv to the first on start timing Ta of the amplifier reset signal RST and supplies the stored voltage to the integrator as a first amplifier output voltage VA with respect to the touch electrodes at the first position AR1. Then, the integrator accumulates the first amplifier output voltage VA multiple times (e.g., three times) to generate a first integrator output voltage.

Referring to FIG. 6 and FIG. 7, the pre-amplifier stores charges flowing from the touch electrodes at the second position AR2 in the feedback capacitor CFB from the rising timing of the touch driving signal Tdrv to the second on start timing Tb of the amplifier reset signal RST and supplies the stored voltage to the integrator as a second amplifier output voltage VB with respect to the touch electrodes at the second position AR2. Then, the integrator accumulates the second amplifier output voltage VB multiple times (e.g., three times) to generate a second integrator output voltage.

In FIG. 6 and FIG. 7, the voltage amplitude of the touch driving signal Tdrv applied to all touch electrodes is fixed to a difference between VTH and VTL irrespective of electrode positions.

Since the second on start timing Tb is ahead of the first on start timing Ta, the level of the second amplifier output voltage VB is lower than the level of the first amplifier output voltage VA by "ΔV". Accordingly, the level of the second integrator output voltage is lower than the level of the first integrator output voltage VA by "ΔΔV".

In this manner, the level of the amplifier output voltage can be differentially controlled according to positions of touch electrodes depending on the toggle timing of the amplifier reset signal RST. The level of the amplifier output voltage can be controlled to be higher at the first position AR1 than at the second position AR2 and to be higher at the third position AR3 than at the second position AR2. Accordingly, the level of the amplifier output voltage increases as positions of touch electrodes become farther from the touch sensing circuit SU, and thus sensitivity deviations at touch electrode positions can be effectively reduced.

To adjust the toggle timing of the amplifier reset signal RST to the first on start timing Ta, the second on start timing Tb, and the third on start timing Tc, the RST adjuster can generate three amplifier reset signals RST having the same on duty and different phases, as illustrated in FIG. 8.

Further, to adjust the toggle timing of the amplifier reset signal RST to the first on start timing Ta, the second on start timing Tb, and the third on start timing Tc, the RST adjuster can generate three amplifier reset signals RST having different on duties, as illustrated in FIG. 9. Accordingly, the amplifier reset signal RST having the first on start timing Ta can have a first on duty, the amplifier reset signal RST having the second on start timing Tb can have a second on duty, and the amplifier reset signal RST having the third on start timing Tc can have a third on duty. In this case, the first on duty is shorter than the second on duty, and the second on duty is shorter than the third on duty. For example, referring to FIG. 9, the three amplifier reset signals RST having different on duties can have the same falling timing and different rising timings.

The Tdrv adjuster can adjust the voltage amplitude of the touch driving signal Tdrv to a first value Da for the touch electrodes at the first position AR1, adjust the voltage amplitude of the touch driving signal Tdrv to a second value Db for the touch electrodes at the second position AR2, and adjust the voltage amplitude of the touch driving signal Tdrv to a third value Dc for the touch electrodes at the third position AR3, as illustrated in FIG. 5. Here, the first value Da is greater than the second value Db, and the second value Db is greater than the third value Dc.

Referring to FIG. 10 and FIG. 11, the pre-amplifier stores charges flowing from the touch electrodes at the first position AR1 in the feedback capacitor CFB from a rising timing of the touch driving signal Tdrv having the amplitude of the first value Da to the on start timing of the amplifier reset signal RST and supplies the stored voltage to the integrator as a first amplifier output voltage VA with respect to the touch electrodes at the second position AR2. Then, the integrator accumulates the first amplifier output voltage VA multiple times (e.g., three times) to generate a first integrator output voltage.

Referring to FIG. 10 and FIG. 11, the pre-amplifier stores charges flowing from the touch electrodes at the second position AR2 in the feedback capacitor CFB from the rising timing of the touch driving signal Tdrv having the amplitude of the second value Db to the on start timing Tb of the amplifier reset signal RST and supplies the stored voltage to the integrator as a second amplifier output voltage VB with respect to the touch electrodes at the second position AR2. Then, the integrator accumulates the second amplifier output voltage VB multiple times (e.g., three times) to generate a second integrator output voltage.

In FIG. 10 and FIG. 11, the on start timing of the amplifier reset signal RST is fixed irrespective of touch electrode positions.

Since the amplitude of the second value Db is less than the amplitude of the first value Da, the level of the second amplifier output voltage VB is lower than the level of the first amplifier output voltage VA. Accordingly, the level of the second integrator output voltage VB is lower than the level of the first integrator output voltage VA by "AAV".

In this manner, the level of the amplifier output voltage can be differentially controlled according to touch electrode positions depending on the voltage amplitude of the touch driving signal Tdrv. The level of the amplifier output voltage can be controlled to be higher at the first position AR1 than at the second position AR2 and to be higher at the third position AR3 than at the second position AR2. Accordingly, the level of the amplifier output voltage increases as positions of touch electrodes become farther from the touch sensing circuit SU, and thus sensitivity deviations at touch electrode positions can be effectively reduced.

Figure 12:
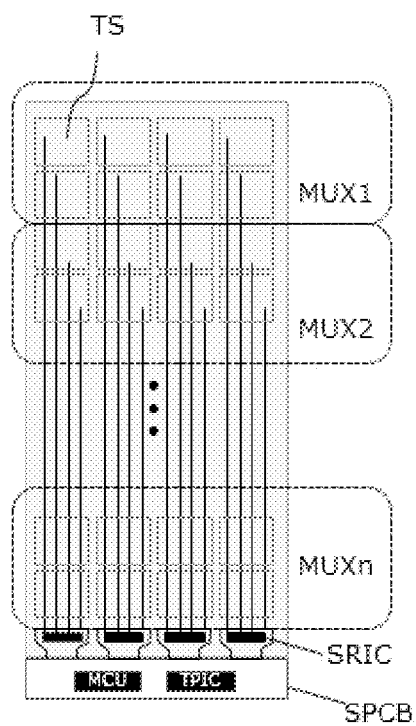
FIG. 12 is a diagram illustrating multiplexer circuits for selectively connecting touch electrodes to the touch sensing circuit.
Figure 13:
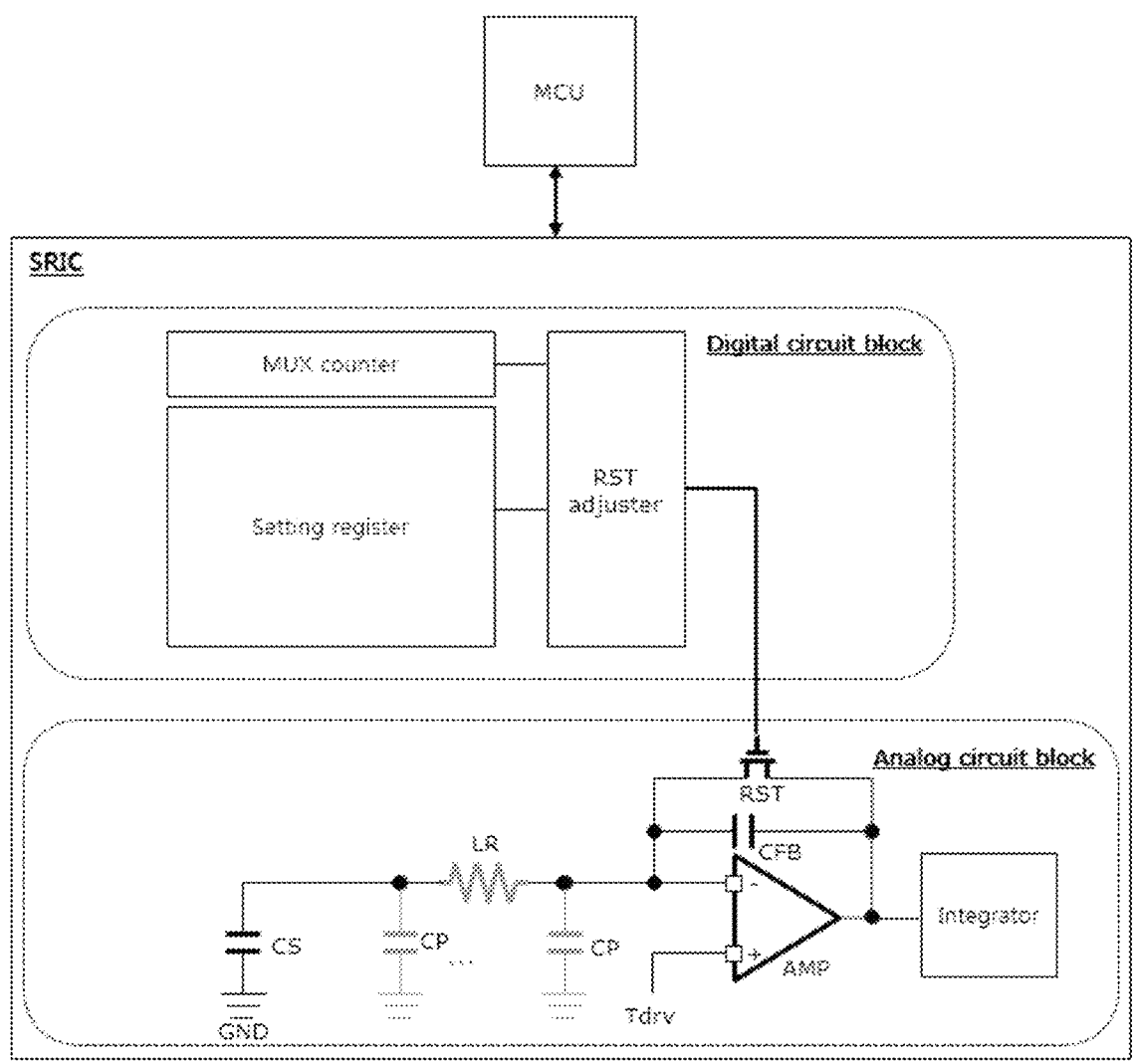
FIG. 13 is a diagram illustrating an example of a configuration of a circuit for differentially adjusting the toggle timing of the amplifier reset signal depending on positions of touch electrodes.

FIG. 12 is a diagram illustrating multiplexer circuits for selectively connecting touch electrodes to the touch sensing circuit and FIG. 13 is a diagram illustrating an example of a configuration of a circuit for differentially adjusting the toggle timing of the amplifier reset signal depending on positions of touch electrodes.

Referring to FIG. 12 and FIG. 13, the RST adjuster can be included in a digital circuit block of the source & readout IC SRIC along with a MUX counter and a setting register. The RST Adjuster, the MUX counter, and the setting register are controlled by an MCU. The MCU can be mounted on a source printed circuit board SPCB along with the TPIC.

The MUX counter generates MUX count information representing the order of connection of touch electrodes TS and the touch sensing circuit SU through a multiplexer MUX. The MUX count information is generated as different values according to the positions of the touch electrodes TS. Different on start timings and on duties of amplifier reset signals RST are set in advance in the setting register according to the positions of the touch electrodes TS. Information related to the amplifier reset signals RST in the setting register can be corrected by the MCU.

The RST adjuster reads an amplifier reset signal RST corresponding to a position of a touch electrode TS from the setting register based on the MUX count information. Accordingly, the toggle timing of the amplifier reset signal RST can be differentially adjusted according to the positions of the touch electrodes.

Figure 14:
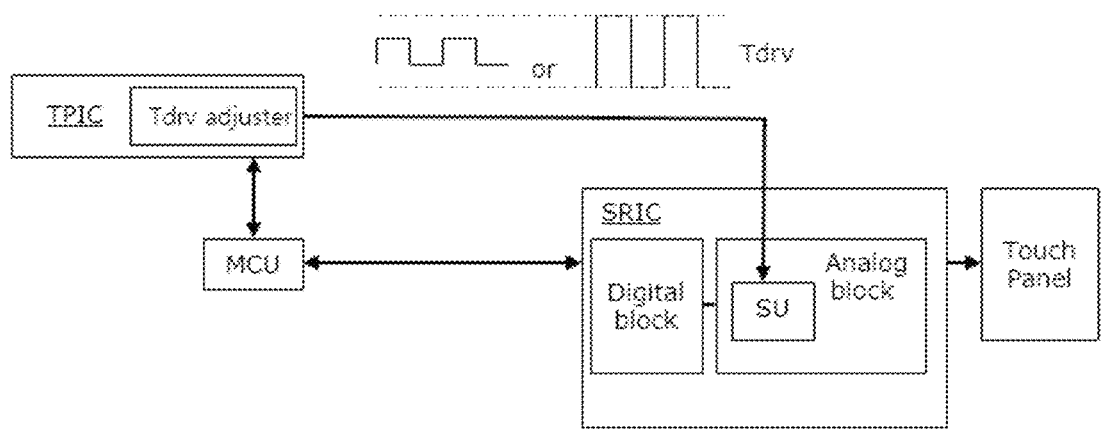
FIG. 14 and FIG. 15 are diagrams illustrating an example of a configuration of a circuit for differentially adjusting the voltage amplitude of the touch driving signal depending on positions of touch electrodes.
Figure 15:
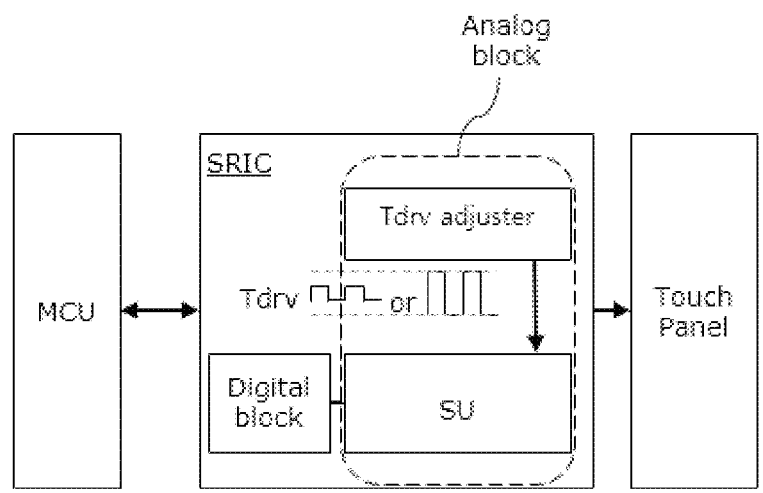

FIG. 14 and FIG. 15 are diagrams illustrating an example of a configuration of a circuit for differentially adjusting the voltage amplitude of the touch driving signal depending on the positions of the touch electrodes.

The Tdrv adjuster can be included in the TPIC as illustrated in FIG. 14 or can be included in an analog circuit block of the source & readout IC SRIC as illustrated in FIG. 15.

In FIG. 14 and FIG. 15, the MUX counter as illustrated in FIG. 13 is mounted in the digital circuit block of the source & readout IC SRIC. The MUX counter generates MUX count information indicating the order of connection between touch electrodes TS and the touch sensing circuit SU through a multiplexer MUX. The MUX count information is generated as different values depending on the positions of the touch electrodes TS.

The Tdrv adjuster detects the positions of touch electrodes TS according to the MUX count information and adjusts the voltage amplitude of the touch driving signal Tdrv in accordance with the positions. The Tdrv adjuster supplies the touch driving signal Tdrv having the voltage amplitude adjusted in accordance with the positions of the touch electrodes TS to the touch sensing circuit SU. The touch driving signal Tdrv is applied to the touch electrodes TS through the pre-amplifier of the touch sensing circuit SU. Accordingly, the voltage amplitude of the touch driving signal Tdrv can be differentially adjusted depending on the positions of the touch electrodes.

Figure 17:
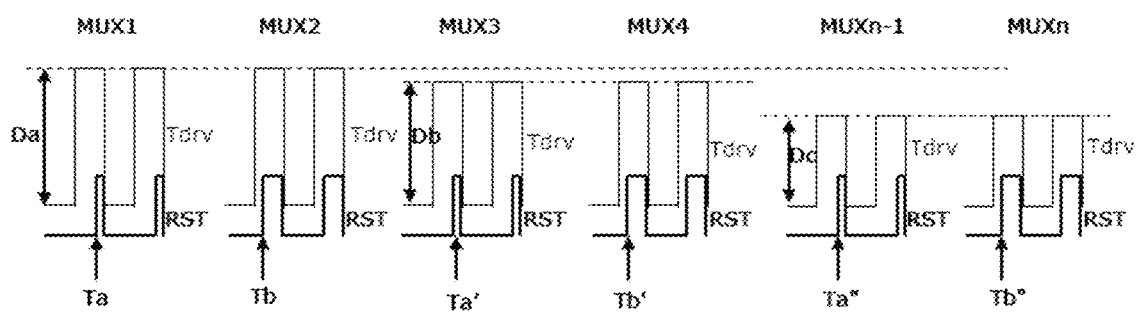

FIG. 16 and FIG. 17 are diagrams illustrating an example of a hybrid configuration for differentially adjusting the toggle timing of the amplifier reset signal and the voltage amplitude of the touch driving signal depending on positions of touch electrodes.

Referring to FIG. 12, FIG. 16, and FIG. 17, positions of touch electrodes connected through a first multiplexer MUX1 are farthest from the touch sensing circuit SU and positions of touch electrodes connected through an n-th multiplexer MUXn are closest to the touch sensing circuit SU.

The amplifier output control circuit differentially adjusts the toggle timing of the amplifier reset signal RST and the voltage amplitude LFD of the touch driving signal Tdrv depending on positions of touch electrodes in the display driving period Pd. Then, the touch sensing circuit SU drives and senses the touch electrodes based on the adjusted factors in the touch sensor driving period Pt.

The amplifier output control circuit can adjust the voltage amplitude of the touch driving signal Tdrv to the same value Da for touch electrodes connected through first and second multiplexers MUX1 and MUX2. However, the amplifier output control circuit can adjust a toggle timing of a first amplifier reset signal RST to Ta for first touch electrodes connected through the first multiplexer MUX1 and adjust a toggle timing of a second amplifier reset signal RST to Tb for second touch electrodes connected through the second multiplexer MUX2. The amplifier output control circuit can control an on duty of the first amplifier reset signal RST to be shorter than an on duty of the second amplifier reset signal RST such that an amplifier output voltage for the first touch electrodes is higher than an amplifier output voltage for the second touch electrodes.

The amplifier output control circuit can adjust the voltage amplitude of the touch driving signal Tdrv to the same value Db for touch electrodes connected through third and fourth multiplexers MUX3 and MUX4. Here, Db is less than Da. However, the amplifier output control circuit can adjust a toggle timing of a third amplifier reset signal RST to Ta' for third touch electrodes connected through the third multiplexer MUX3 and adjust a toggle timing of a fourth amplifier reset signal RST to Tb' for fourth touch electrodes connected through the fourth multiplexer MUX4. The amplifier output control circuit can control an on duty of the third amplifier reset signal RST to be shorter than an on duty of the fourth amplifier reset signal RST such that an amplifier output voltage for the third touch electrodes is higher than an amplifier output voltage for the fourth touch electrodes.

The amplifier output control circuit can adjust the voltage amplitude of the touch driving signal Tdrv to the same value Dc for touch electrodes connected through (n−1)-th and n-th multiplexers MUXn−1 and MUXn. Here, Dc is less than Db. However, the amplifier output control circuit can adjust a toggle timing of an (n−1)-th amplifier reset signal RST to Ta" for (n−1)-th touch electrodes connected through the (n−1)-th multiplexer MUXn−1 and adjust a toggle timing of an n-th amplifier reset signal RST to Tb" for n-th touch electrodes connected through the n-th multiplexer MUXn. The amplifier output control circuit can control an on duty of the (n−1)-th amplifier reset signal RST to be shorter than an on duty of the n-th amplifier reset signal RST such that an amplifier output voltage for the (n−1)th touch electrodes is higher than an amplifier output voltage for the n-th touch electrodes.

FIG. 18 is a diagram illustrating an example of differentially adjusting the toggle timing of the amplifier reset signal in a finger sensing mode and a pen sensing mode and FIG. 19 is a diagram illustrating an example of differentially adjusting the toggle timing of the amplifier reset signal in a self-sensing mode and a mutual sensing mode.

Referring to FIG. 18, the touch sensing circuit can implement the finger sensing mode and the pen sensing mode in the touch sensor driving period Pt. The touch sensing circuit generates an amplifier output voltage according to finger touch input in the finger sensing mode and generates an amplifier output voltage according to pen touch input in the pen sensing mode. Touch sensitivity can be different in the finger sensing mode and the pen sensing mode for touch electrodes at the same position.

The amplifier output circuit can adjust the toggle timing of the amplifier reset signal RST to the first on start timing in the pen sensing mode and adjust the toggle timing of the amplifier reset signal RST to the second on start timing ahead of the first on start timing in the finger sensing mode for touch electrodes at the same position to improve touch sensitivity deviation between the sensing modes.

Referring to FIG. 19, the touch sensing circuit can implement the self-sensing mode and the mutual sensing mode in the touch sensor driving period Pt. The touch sensing circuit generates an amplifier output voltage based on self-capacitance according to touch input in the self-sensing mode and generates an amplifier output voltage based on mutual capacitance according to touch input in the mutual sensing mode. Touch sensitivity can be different in the self-sensing mode and the mutual sensing mode for touch electrodes at the same position.

The amplifier output circuit can adjust the toggle timing of the amplifier reset signal RST to the first on start timing in the self-sensing mode and adjust the toggle timing of the amplifier reset signal RST to the second on start timing ahead of the first on start timing in the mutual sensing mode for touch electrodes at the same position to improve touch sensitivity deviation between the sensing modes.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims and their equivalents.

The display device having a touch sensor according to the embodiment of the present disclosure can improve sensitivity deviations at positions of touch electrodes to enhance touch performance.

Furthermore, the display device having a touch sensor according to the embodiment of the present disclosure can improve sensitivity deviations between sensing modes to enhance touch performance.

What is claimed is:

1. A display device having a touch sensor, comprising:
   a display panel including a plurality of touch electrodes; and
   a readout integrated circuit (IC) configured to:
   apply a touch driving signal to the plurality of touch electrodes and amplify charges from the plurality touch electrodes according to an amplifier reset signal to generate an amplifier output voltage, and
   differentially adjust a toggle timing of the amplifier reset signal based on positions of the plurality of touch electrodes to control a level of the amplifier output voltage.

2. The display device according to claim 1, wherein the readout IC is further configured to:
   differentially adjust an on-start timing of the amplifier reset signal and an on duty of the amplifier reset signal based on the positions of the plurality of touch electrodes.

3. The display device according to claim 1, wherein the readout IC includes a touch sensing circuit and an amplifier output control circuit.

4. The display device according to claim 3, wherein the amplifier output control circuit is configured to:
   adjust the toggle timing of the amplifier reset signal to a first on-start timing for a first group of touch electrodes at a first position from among the plurality of touch electrodes, and
   adjust the toggle timing of the amplifier reset signal to a second on-start timing ahead of the first on-start timing for second group of touch electrodes at a second position from among the plurality of touch electrodes, and
   wherein the first position is farther away from the touch sensing circuit than the second position.

5. The display device according to claim 4, wherein the amplifier reset signal having the first on-start timing and the amplifier reset signal having the second on-start signal have a same on duty and different phases.

6. The display device according to claim 4, wherein the amplifier reset signal having the first on-start timing has a first on duty, and the amplifier reset signal having the second on-start signal has a second on duty, and
   wherein the first on duty is shorter than the second on duty.

7. The display device according to claim 3, wherein the amplifier output control circuit is further configured to:
   adjust a voltage amplitude of the touch driving signal to a first value for a first group of touch electrodes at a first position from among the plurality of touch electrodes, and
   adjust the voltage amplitude of the touch driving signal to a second value less than the first value for a second group of touch electrodes at a second position from among the plurality of touch electrodes, and
   wherein the first position is farther away from the touch sensing circuit than the second position.

8. The display device according to claim 7, wherein the amplifier output control circuit is further configured to:
   when a touch sensing period and a display period are alternately arranged multiple times in one frame, adjust the voltage amplitude of the touch driving signal to the first value or the second value in the display period.

9. The display device according to claim 3, wherein the touch sensing circuit is configured to:
   generate the amplifier output voltage based on a finger touch input in a finger sensing mode, and
   generate the amplifier output voltage based on a pen touch input in a pen sensing mode.

10. The display device according to claim 9, wherein a touch sensitivity in the finger sensing mode is different than a touch sensitivity in the pen sensing mode.

11. The display device according to claim 9, wherein the amplifier output control circuit is configured to:
   adjust the toggle timing of the amplifier reset signal to a first on-start timing in the pen sensing mode, and
   adjust the toggle timing of the amplifier reset signal to a second on-start timing ahead of the first on-start timing in the finger sensing mode.

12. The display device according to claim 3, wherein the touch sensing circuit is configured to:
   generate the amplifier output voltage based on a self-capacitance according to a touch input in a self-sensing mode, and
   generate the amplifier output voltage based on a mutual capacitance according to a touch input in a mutual sensing mode.

13. The display device according to claim 12, wherein a touch sensitivity in the self-sensing mode is different than a touch sensitivity in the mutual sensing mode.

14. The display device according to claim 12, wherein the amplifier output control circuit is configured to:
   adjust the toggle timing of the amplifier reset signal to a first on-start timing in the self-sensing mode, and
   adjust the toggle timing of the amplifier reset signal to a second on-start timing ahead of the first on-start timing in the mutual sensing mode.

15. The display device according to claim 1, wherein the readout IC includes a plurality of multiplexers, a touch sensing circuit, and a common voltage generator.

* * * * *